United States Patent [19]

Begley et al.

[11] Patent Number: 4,492,005
[45] Date of Patent: Jan. 8, 1985

[54] CONDUIT CLAMP (CASE 1)

[76] Inventors: Maxwell G. Begley, 632 Light St., Dianella, Western Austrailia 6062; Keith Munslow-Davies, 7 Chaffers St., Morley, Western Australia 6062, both of Australia

[21] Appl. No.: 442,163

[22] Filed: Nov. 16, 1982

[30] Foreign Application Priority Data

Jun. 23, 1982 [AU] Australia ............................... PF4557

[51] Int. Cl.³ .......................... B65D 63/02; F16L 3/08
[52] U.S. Cl. .......................................... 24/270; 24/24; 24/279; 24/498; 24/516; 285/409
[58] Field of Search ...................... 24/270, 271, 274 P, 24/279, 285, 286, 24, 457, 504, 498, 494, 503, 506, 508, 509, 516, 517, 500; 248/74 R; 285/409

[56] References Cited

U.S. PATENT DOCUMENTS

| 1,110,011 | 9/1914 | Schneider | 24/516 |
| 1,303,249 | 5/1919 | Brown | 248/74 R |
| 1,693,064 | 11/1928 | Tipton | 24/270 |
| 2,245,532 | 6/1941 | Severy | 24/270 |
| 2,388,674 | 11/1945 | Browne | 24/279 |
| 2,453,492 | 11/1948 | Carter | 24/270 |
| 2,752,174 | 6/1956 | Frost | 24/270 |
| 2,775,806 | 1/1957 | Love | 24/271 |
| 3,637,011 | 1/1972 | Wheeler | 24/498 |
| 3,826,469 | 7/1974 | Ratcliff et al. | 24/270 |
| 4,059,872 | 11/1977 | Delesandri | 24/279 |

FOREIGN PATENT DOCUMENTS

| 1266578 | 6/1961 | France | 24/285 |
| 1472750 | 5/1977 | United Kingdom | 285/409 |

Primary Examiner—Victor N. Sakran
Attorney, Agent, or Firm—Kerkam, Stowell, Kondracki & Clarke

[57] ABSTRACT

The present invention provides a conduit clamp comprising means for securing a conduit such as a hose to another structure, a pair of jaws arranged to be clamped around a conduit, means on one side of a first jaw arranged to engage pivotally with complementary means on the corresponding side of a second jaw, means for closing the jaws into clamping engagement with a conduit which closing means comprises an open sided recess in one jaw, a locking pin mounted in an aperture in the other jaw and a lever pivotally attached to the locking pin, the arrangement being such that when the lever is moved to a first position the locking pin is released from and then pivoted away from the recess and when the lever is moved to a second position the locking pin is moved into the recess and then locked thereinto.

The clamp of the present invention is particularly envisaged for sub-sea operation such as in oil drilling but it can be used for mining and industrial applications which are not underwater.

9 Claims, 6 Drawing Figures

CONDUIT CLAMP (CASE 1)

The present invention relates to a conduit clamp.

In underwater operations such as when drilling for oil, it is necessary to attach conduits such as hoses to another structure so as to stabilise the conduit.

The present invention provides a conduit clamp which is particularly envisaged for use underwater especially for subsea operation, but which can be used for mining and industrial applications which are not under water.

In accordance with the present invention there is provided a conduit clamp comprising means for securing a conduit to another structure, a pair of jaws arranged to be clamped around a conduit, means on one side of a first jaw arranged to engage pivotally with complementary means on the corresponding side of a second jaw, means for closing the jaws into clamping engagement with a conduit which closing means comprises a recess in one jaw, a locking pin mounted in an aperture in the other jaw and a lever attached to the locking pin, the arrangement being such that when the lever is moved to a first position the locking pin is released from and pivoted away from the recess and when the lever is moved to a second position the locking pin is moved into the recess and then locked thereinto.

The present invention will now be described, by way of example, with reference to the accompanying drawings, in which.

Figure 1:
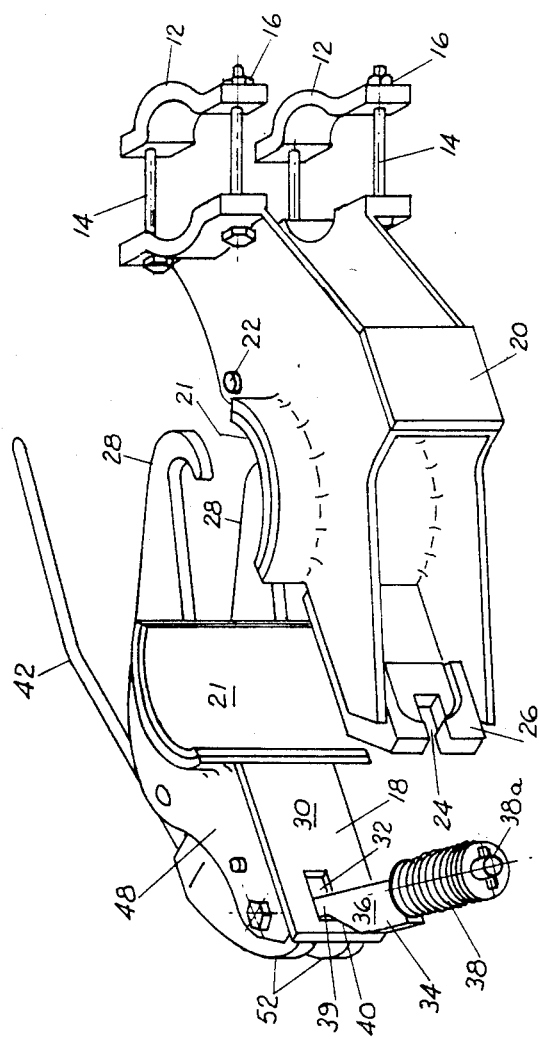
FIG. 1 is a perspective view of one embodiment of a clamp in accordance with the present invention.

In FIG. 1, there is shown a conduit clamp in accordance with the present invention which is particularly designed for sub-seal operation.

The clamp of FIG. 1 comprises means for securing a conduit particularly a hose to another structure which in this case is a permanent structure in the form of a kill and choke line. The means for attaching a conduit to a kill and choke line comprises two pairs of members 12 held in face to face but spaced relation by a pair of threaded bolts 14. In known manner the bolts 14 have nuts 16 at each end and are threadedly engaged with apertures in the members 12. The members 12 contain part circular portions arranged to engage clampingly a kill and choke line.

The attachment means 12 is connected to a jaw 20 of a pair of jaws 18 and 20. Each jaw 18 and 20 comprises a rubber lined part cylindrical recess 21 for clamping engagement with the outer surface of a conduit such as a large diameter hose line.

At its end remote from the attachment means 12, the jaw 20 contains a recess 24 which is open ended but which has a part circular retaining shoulder 26 built around its outer, open end.

Further, the jaw 20 has a pair of pins 22 (only one of which can be seen) for purposes which will be described hereinafter.

The jaw 18 has at one end a pair of outwardly projecting hooks 28. The jaw 18 has at its other end an outwardly extending flange 30 containing an aperture 32. A locking pin 34 is mounted within the aperture 32. Further, the locking pin 34 comprises a relatively thick intermediate portion 36, an outer portion about which is mounted a coil spring 38, and an inner portion 39 which is relatively thin and is connected to the intermediate portion by a tapering portion 40. The coil spring 38 abuts against a stop 38a which enables the spring 38 to be compressed.

The locking pin 34 is pivotally connected to a lever 42 by a mechanism which will be described in detail hereinafter in relation to FIGS. 3, 4 and 5.

Figure 2:
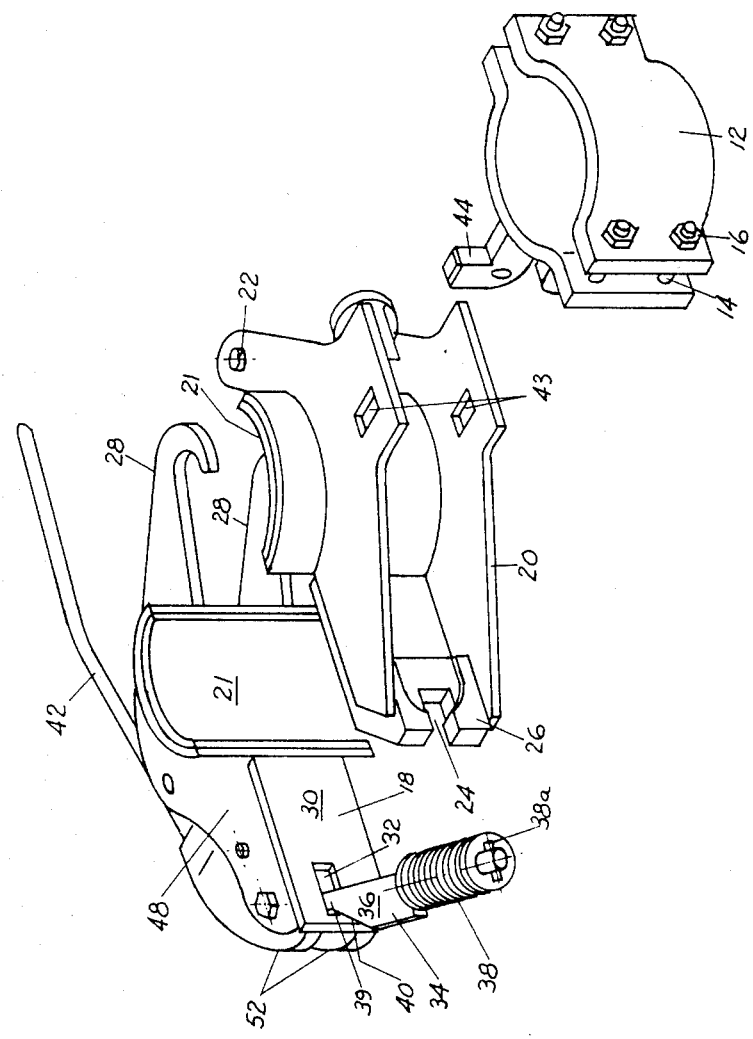
FIG. 2 is a perspective view of a second embodiment of a clamp in accordance with the present invention.

The clamp of FIG. 2 is very similar to the clamp of FIG. 1. The only difference is that the means for securing the clamp to a kill and choke line is completely detachable from the jaw 20. Typically, kill and choke lines are attached laterally of a main riser and the conduit may be attached by the clamp of the present invention to the kill and choke line. Sometimes it is desired to use flotation modules on the main riser and in this case the hose line and associated clamp projects outwardly from the flotation modules. Thus, when running or retrieving the main riser, it is desirable to be able to detach the conduit and the main part of the clamp from the main riser assembly to avoid damage to the conduit and its clamp. Thus, in the construction of FIG. 2, the jaw 20 is provided with a pair of aligned recesses 43 arranged to receive a tongue 44, projecting upwardly from the attachment means. As shown, the tongue 44 contains an aperture 45 extending through it. The aperture 45 is situated between the apertures 41 in use and is arranged to receive a locking pin (not shown) arranged to prevent the tongue 44 sliding out of the apertures 41 when in use.

Figure 3:
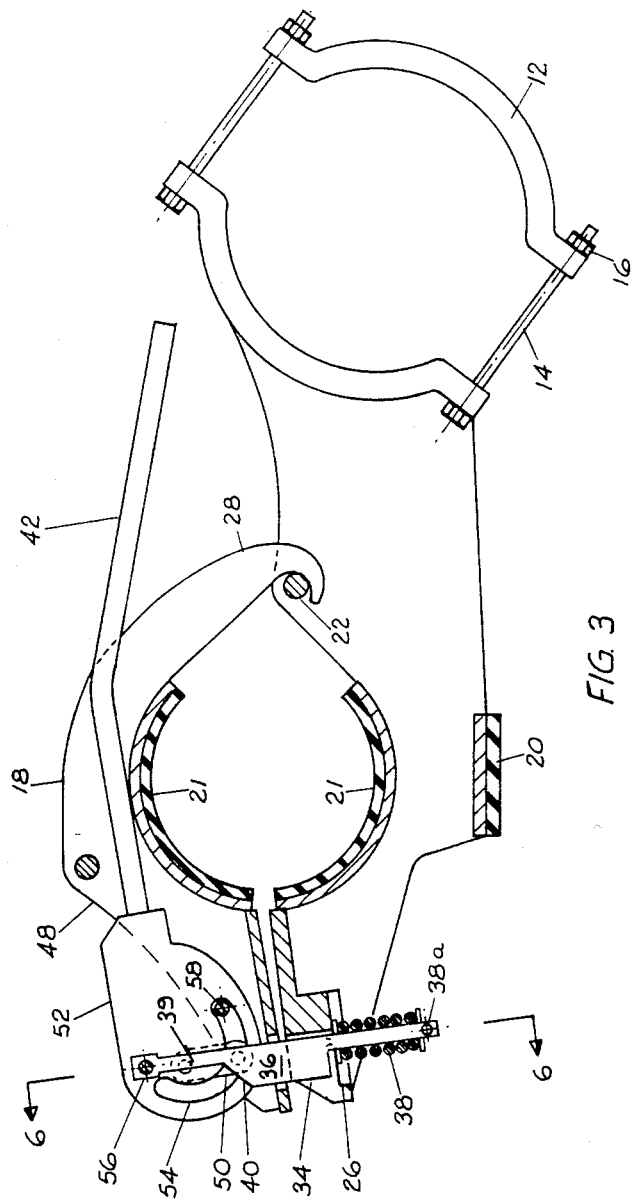
FIG. 3 is a horizontal sectional view through the clamp of FIG. 1 in closed condition.
Figure 4:
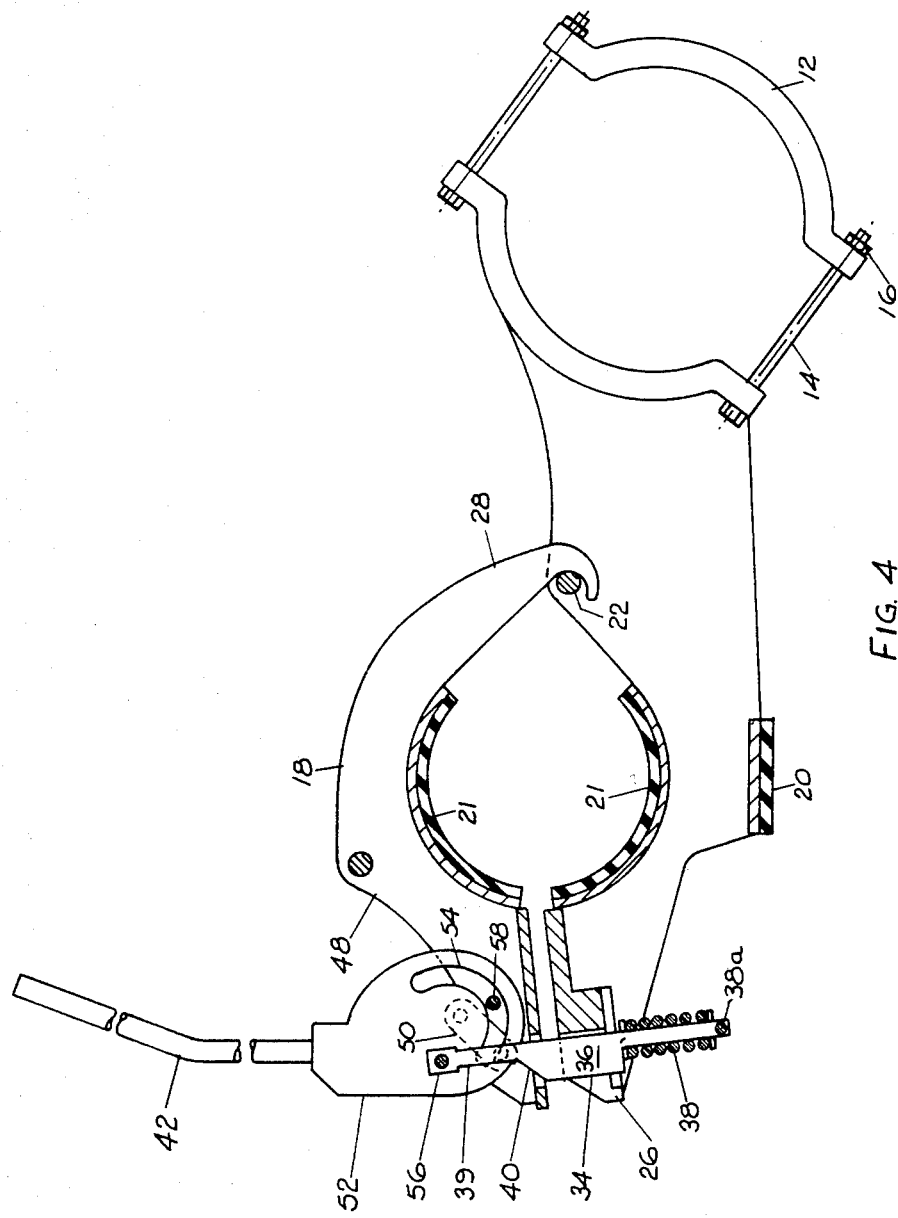
FIG. 4 is a view, similar to FIG. 3, with the clamp in an intermediate condition.
Figure 5:
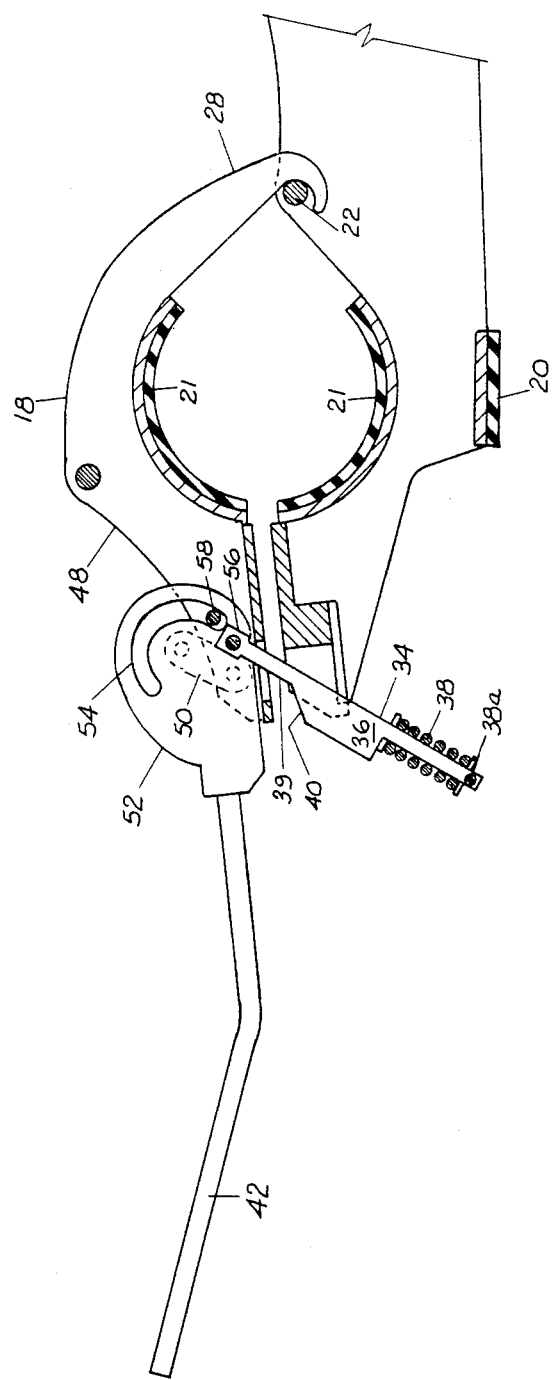
FIG. 5 is a partial view, similar to FIG. 3, with the clamp in an open condition.

The sections shown in FIGS. 3, 4 and 5 are taken on the embodiment of FIG. 1.

The clamp of the present invention as shown in FIGS. 3, 4, 5 and 6 has the pair of pins 22. Each of the hooks 28 is arranged to engage with a respective one of said pins 22 in a detachable and pivotal manner at one end of the clamp.

Figure 6:
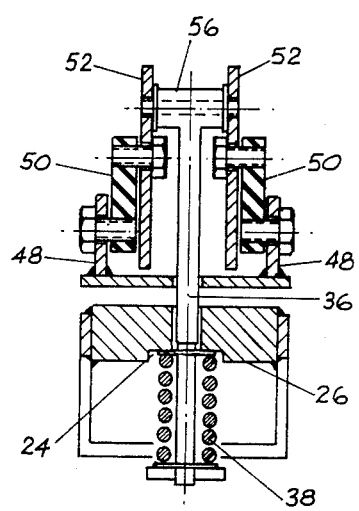
FIG. 6 is a sectional view of the clamp of FIG. 1 in closed condition as viewed along the line B—B of FIG. 3.

At the other end of the clamp, as can best be seen in FIG. 6 a pair of parallel spaced flanges 48 project outwardly from the jaw 18. A pair of rigid connecting rods 50 are pivotally mounted at one end to a respective flange 48 on a stud and at the other end to an inner end 52 of the lever 42 on a stud. The inner end 52 of the lever 42 is enlarged and comprises a pair of spaced plates each containing an arcuate slot 54.

Further, the inner end of the locking pin 34 comprises a cross bar 56 which is pivotally mounted on lateral extensions located in respective opposed apertures in the plates of the inner end 52.

Still further, a locating pin 58 extends between the plates of the inner end 52 and is located in the jaw 18 in a fixed location by being inserted in apertures in the flanges 48. The locating pin 58 also extends through the arcuate slots 54 of the plates of the inner end 52.

In use, the lever 42 may, as shown in FIGS. 3, 4 and 5, be pivoted through 180° to lock or unlock the clamp of the present invention. In the position shown in FIG. 3, the clamp is locked and the lever 42 is adjacent the jaw 18.

To open the clamp, the lever 42 is pivoted upwardly about its inner end 52 away from the jaw 18. This causes the arcuate slots 54 of the inner end 52 to traverse about the locating pin 58 on the mounting to the flanges 48 via the pivotal mounts of the connecting rods 50.

Initially, as shown in FIG. 4, this causes the locking pin 34 to be pushed through the aperture 32 and the recess 24 at least until the spring 38 is completely clear of the shoulder 26. Subsequently, as shown in FIG. 5, the shape of the arcuate slots 54 causes the cross bar 56 of the pin 34 to be moved laterally away from the aperture 32. Thus, the pin 34 is then tilted upon continued movement of the lever 42. In this position, the tapered portion 40 is adjacent the aperture 32. The locking pin 34 is able to pivot in the aperture 32 and consequentially to leave the recess 24. The locking pin 34 then pivots clear of the recess 24 and the clamp of the present invention is opened by one action i.e. that of moving the lever 42. The jaw 18 is now free to pivot on the connection between the hooks 28 and the pins 22.

To close the clamp the lever 42 is pivoted back to the position shown in FIG. 3.

Initially with the jaws 18 and 20 closed up, the locking pin 34 is in reverse manner pivoted back into the recess 24 and then pulled through the recess 24 and aperture 32 until the spring 38 is pulled behind the shoulder 26 and compressed against the jaw 20. By pulling the spring 38 behind the shoulder 26 and compressing the spring 38 the locking pin 34 is firmly secured against movement in any direction until the lever 42 is moved again.

Modifications and variations such as would be apparent to a skilled addressee are deemed within the scope of the present invention. For example, the detachable coupling of the hooks 28 and pins 22 could be replaced by an equivalent permanent pivotal coupling. Also, if desired the lever 42 and its associated mechanism could be rotated through 90° so that the recess 24 faces upwardly or downwardly.

We claim:

1. A conduit clamp comprising means for securing a conduit to another structure, a pair of jaws arranged to be clamped around a conduit, means on one side of a first jaw arranged to engage pivotally with complementary means on the corresponding side of a second jaw, means for closing the jaws into clamping engagement with a conduit which closing means comprises an open sided recess in one jaw, a locking pin mounted in an aperture in the other jaw, a lever having an inner end, the inner end of the lever being pivotally connected to the locking pin, and the inner end of the lever being pivotally connected to the other jaw at a spacing from the pivotal connection to the locking pin and being located adjacent the aperture in the other jaw, the lever having a first position in which the locking pin is located in the open sided recess which first position of the lever corresponds with a clamping position of the jaws, the lever having a second position in which the locking pin is pivoted away from the recess which second position of the lever corresponds with an open position of the jaws, the pivotal connection of the locking pin to the lever being remote from the aperture and being substantially in alignment with the aperture and the open sided recess in the first position of the lever and the pivotal connection of the locking pin to the lever being adjacent to but disposed laterally of the aperture in the second position of the lever, the arrangement being such that when the lever is pivoted towards its second position, the pivotal connection of the locking pin and lever initially moves towards the aperture to push the locking pin through the aperture and recess so as to release the locking pin, and then the pivotal connection of the locking pin and lever moves laterally relative to the aperture so as to cause the locking pin to be pivoted against an edge of the aperture away from the recess, and when the lever is pivoted towards its first position the locking pin pivots back into the recess and is then pulled through the recess and aperture so as to be locked into the recess.

2. A conduit clamp according to claim 1, wherein the locking pin is associated with a spring mounted about the locking pin, which spring is compressed into engagement with the said one jaw when the locking pin is in its locking position and which spring is decompressed upon movement of the lever towards the second position to enable the lever to be released from the recess.

3. A conduit clamp according to claim 2, in which there is a shoulder around the open side of the recess for restraining lateral movement of the locking pin when it is in its locking position.

4. A conduit clamp according to claim 2 in which the movement of the lever between the first and second positions is constrained by an arcuate slot in the said inner end engaging with a locating pin mounted in the said other jaw.

5. A conduit clamp according to claim 2 in which the movement of the lever between the first and second positions is constrained by an arcuate slot in the said inner end engaging with a locating pin mounted in the said other jaw, and wherein the pivotal connection between the inner end of the lever and the said other jaw is in the form of a rigid connecting rod pivotally mounted at one end to the inner end of the lever and pivotally mounted at the other end to the said other jaw.

6. A conduit clamp according to claim 1 in which the means for securing the conduit to another structure is arranged to secure the conduit to a kill and choke line.

7. A conduit clamp according to claim 1 in which the means for securing the hose to another structure is detachable from the remainder of the clamp.

8. A conduit clamp according to claim 1 in which the jaws are detachable from one another by separating the means on one side of the first jaw arranged to engage pivotally with complementary means on the corresponding side of the second jaw.

9. A conduit clamp according to claim 8, in which a first jaw is provided with a hook and a second jaw is provided with a complementary pin.

* * * * *